United States Patent [19]
Prochnow

[11] 3,916,424
[45] Oct. 28, 1975

[54] ELECTRONIC FLASH DEVICE FOR PHOTOGRAPHIC CAMERAS

[75] Inventor: Claus Prochnow, Braunschweig, Germany

[73] Assignee: Rollei-Werke Franke & Heidecke, Braunschweig, Germany

[22] Filed: Oct. 9, 1973

[21] Appl. No.: 404,718

[30] Foreign Application Priority Data
Oct. 21, 1972 Germany............................ 2251756

[52] U.S. Cl.................................. 354/149; 354/47
[51] Int. Cl.².......................................... G03B 15/05
[58] Field of Search ............. 95/11 R, 11 L, 11.5 R, 95/10 C; 240/1.3; 354/149, 139, 35, 47

[56] References Cited
UNITED STATES PATENTS

| | | | |
|---|---|---|---|
| 3,171,337 | 3/1965 | Fischer ........................... | 354/139 X |
| 3,273,479 | 9/1966 | Jakob.................................. | 354/149 |
| 3,318,215 | 5/1967 | Schiks................................ | 95/11.5 R |
| 3,335,650 | 8/1967 | Schmidt et al....................... | 95/11 R |
| 3,511,144 | 5/1970 | Götze................................ | 95/10 C |
| 3,633,476 | 1/1972 | Yazaki................................ | 95/11 R |

*Primary Examiner*—Samuel S. Matthews
*Assistant Examiner*—Kenneth C. Hutchison
*Attorney, Agent, or Firm*—Stonebraker, Shepard & Stephens

[57] ABSTRACT

A photographic camera of the type having provision for automatic exposure control (for automatically setting either the diaphragm aperture, or the shutter speed, or both, in accordance with the prevailing light as measured by an exposure meter) in combination with an electronic flash unit detachably mountable on and removable from the camera. In distinction to prior arrangements where the mounting of the flash unit on the camera served to disconnect the automatic exposure control of the camera and where the automatic exposure control could not be reactivated until the flash unit was removed from the camera, the present construction provides for de-activating and reactivating the automatic exposure control by operation of the on and off switch of the flash unit. It is the position of this switch, acting through a projection on the switch mechanism which extends through an opening into the camera body, which serves to activate or de-activate the automatic exposure control of the camera, and to control the setting of the diaphragm to the proper aperture for use with the flash unit, according to its guide number.

5 Claims, 1 Drawing Figure

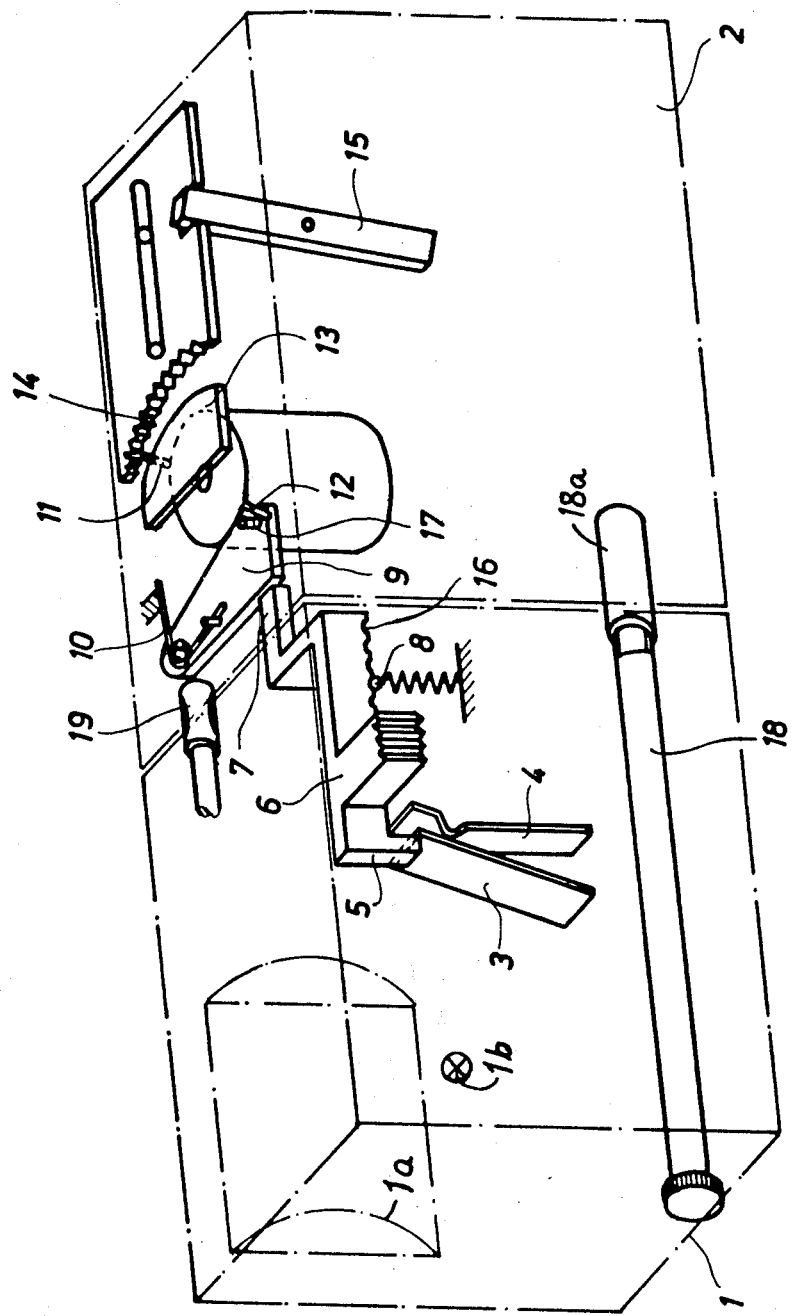

ELECTRONIC FLASH DEVICE FOR PHOTOGRAPHIC CAMERAS

BACKGROUND OF THE INVENTION

In certain known types of cameras, there is provision for automatic setting of the exposure, the automatic mechanism serving to set either the diaphragm aperture, or the shutter speed, or sometimes both, in accordance with the light falling on the subject as determined by exposure meter mechanism built into the camera. Such cameras are well known in the art, and hence it is unnecessary to illustrate or describe the automatic exposure mechanism in detail.

It is also known in the art to provide an electronic flash unit for use with a camera of the kind just mentioned. When flash light is used for taking a photograph with a camera having automatic exposure control, the automatic exposure control of the camera must be disconnected or de-activated because, as well understood by those skilled in the art, the diaphragm aperture and the shutter speed are not dependent upon the light as measured by an exposure meter in the normal daylight way, but are dependent on factors such as the so-called "guide number" of the flash apparatus. In one known form of apparatus, the act of mounting the flash unit on the camera body serves, through cooperating contact parts, to disconnect or de-activate the automatic exposure control mechanism of the camera. But in this known form, the automatic exposure control cannot be reactivated except by the act of removing the flash unit from the camera body. This is very unsatisfactory and inconvenient, however, because sometimes one wishes to take photographs with and without flash in rapid succession, and it is troublesome and awkward to remove the flash unit or to mount it on the camera, as the case may be, between successive photographs. Moreover, in this prior known arrangement, it is not possible to use "fill-in" flash to lighten the shadows when taking a daylight photograph with automatic exposure control.

An object of the present invention is to overcome the difficulties just mentioned, and to provide flash apparatus so designed that when the flash apparatus is attached to the camera, the flash may be either used or not used as desired, and so designed that when the flash is used, the automatic exposure control is automatically disconnected, and when the flash is not used, the automatic exposure control is re-activated and operative even though the flash unit still remains in mounted position on the camera.

Another object is the provision of such apparatus of relatively simple and sturdy design, in a form which is easy to construct and not likely to get out of order.

A further object is the provision of apparatus so designed that, while the flash unit is mounted in proper position on the camera body, the mere act of turning on the flash unit serves to render the automatic exposure control of the camera inoperative, and the mere act of turning off the main switch of the flash unit serves to render the automatic exposure control operative again, without the necessity for removing the flash unit physically from the camera.

BRIEF DESCRIPTION OF THE DRAWING

The single view is a schematic perspective view, from the rear, of a flash unit attached to a camera body, illustrating schematically the cooperating parts according to one exemplary embodiment of the invention.

DESCRIPTION OF THE PREFERRED EMBODIMENT

According to the invention, the on-off switch of the flash unit is provided with a protuberance so placed that when the switch is moved to the "on" position, the protuberance moves out of an opening in the flash unit and enters the interior of the camera body through a corresponding opening in the camera, and there it forms or controls an abutment for the diaphragm aperture or stop of the camera, to cause the diaphram aperture to be set to a stop appropriate to the guide number of the flash device. In an electronic flash device for attachment to a camera having a photoelectric exposure meter with automatic diaphragm or stop setting, the switching protuberance just mentioned then forms or controls an abutment for a stop-determining (diaphragm aperture determining) sensing pointer of the exposure meter of the camera.

The user obtains the advantage that no manual control needs to be switched from automatic to flash or vice versa. The switch which is always present anyway on the flash device is used for converting the camera from automatic daylight exposure to flash operation, or from flash operation back to automatic daylight exposure. A further advantage consists in the fact that the electronic flash device according to this invention also enables photographs to be taken by "fill-in" technique. For this purpose the on-off switch of the flash unit is moved to the on position long enough to charge up the electronic flash unit to working condition, and when the usual signaling glow lamp is illuminated to indicate that the flash unit is properly charged, the switch is then shifted to the "off" position, and the camera is operated in the usual way to take the photograph. Because the switch has been moved to off position, the automatic diaphragm control of the camera has again become operative, but when the photograph is taken promptly thereafter, the charge still remains on the usual storage capacitor of the flash unit, and so the flash will operate (on account of the conventional synchronizing electric connection between the camera shutter and the flash unit) and the flash will serve to fill-in the shadows of the photograph taken with the conventional automatic diaphragm control under daylight conditions.

When the present invention is incorporated in an electronic flash device having a plurality of guide numbers and therefore a variable working shutter, the on-off switch of the flash unit is in the form of a slider switch having a plurality of different on positions determined by detents, and corresponding to the various different guide numbers of which the flash unit is capable. Corresponding stop values (diaphragm aperture openings) in the camera are associated with these different detent positions. The camera then works with various different stops, depending on the chosen guide number of the electronic flash device.

Referring now to the drawing, the flash device in general, as viewed in perspective from the rear, is shown schematically at 1, and has the usual conventional forwardly faced reflector 1a, within which is mounted the conventional flash tube, not shown. The circuits for operating the flash tube, including one or more storage capacitors, and one or more batteries for producing the charge for the storage capacitors, are conventional and well known, and are not illustrated. The circuits include a conventional glow tube shown schematically at 1b which, when it glows, indicates that the storage capacitor is fully charged and the apparatus is ready for a flash.

This flash unit or device 1 is detachably mountable on a camera indicated schematically at 2. The camera, except for the parts specifically illustrated and described, is of the usual conventional construction, containing the usual parts such as a lens, shutter, diaphragm, film holding and transporting mechanism, and light meter for controlling the diaphragm aperture or stop of the camera, none of which parts is illustrated because all are so well known. When the flash unit is mounted on the camera body, the parts are held together by any suitable detachable fastening means, such as the long screw 18 passing through the flash unit and threaded into a threaded socket 18a in the camera body. An electric plug connection 19 serves to connect the flash synchronizer circuit of the camera shutter to the appropriate part of the circuitry of the flash apparatus. Also this electric plug connection, being at some distance offset from the connecting means 18 and entering snugly from the flash unit into the camera body, serves to prevent the flash unit from twisting or turning on the axis of the screw connection 18, and holds the flash unit properly oriented relative to the camera body.

At the rear of the flash unit there are switch contacts 3 and 4, which can be connected or disconnected by means of a lug 5 on a slider switch 6 having a manually accessible operating arm extending out through a horizontal slot in the rear wall of the flash unit. The right hand end of the slider switch is bent over as illustrated, and terminates in a protuberance 7 which, when the switch is moved from off position to on position, projects out through an opening in the right hand end wall of the flash unit 1, and enters into the camera body 2 through a corresponding opening in the left hand end wall thereof. When this protuberance 7 enters the camera it forms, via an intermediate lever 9, an abutment for the sensing pointer 12 of the photoelectric exposure meter of the camera. The position of this pointer 12 determines the stop, that is, the size of the diaphragm aperture. The intermediate lever 9 is provided with a return spring 10 which shifts the lever 9 out of the range of the sensing pointer 12 during non-use of the electronic flash device, that is, when the on-off switch of the flash device is moved back to the off position.

The sensing pointer 12 cooperates with a further sensing pointer 11 of the automatic programming system of the camera, this pointer 11 being present on the same measuring instrument. When the electronic flash device is not in use, the pointer 11 is urged by the clamping steps 14 against the clamping table 13, and the appropriate diaphragm stop and/or exposure interval is set via the transmission lever 15 in conventional known manner.

In addition to the two detent positions for the on and off switching movement, the slider switch 6 has further detent positions determined by entry of the spring pressed detent ball 8 into one or another of the detent notches 16. These correspond to various diaphragm stops in the camera.

At its end remote from its pivot point, the intermediate lever 9 has a pin 17 which transforms the translatory movement of the switching protuberance 7 into a rotary movement for the sensing pointer 12. The swinging movement of the pin 17 about the pivot point of the lever 9 is not approximately radial with respect to the center of rotation of the pointer 12, but on the contrary is at a considerable angle to a radius from the pointer 12 to its center of rotation. Therefore as the lever 9 and pin 17 swing closer to or farther away from the center of rotation of the pin 12 (as a result of placing the switch member 6 in one or another of its detent positions) this will serve to adjust the position of the pointer 12 in a rotary direction. Thus the diaphragm aperture of the camera (since it is dependent upon the rotary position of the pointer 12) is set, during use of the flash apparatus, at a value determined by the particular detent position in which the switch 6 is set. If, in known manner, the flash apparatus is capable of producing flashes of various intensities, thus having various guide numbers, the particular detent position of the switch 6 is arranged, through known circuitry, to determine which guide number is to be effective for a particular flash, and the diaphragm aperture of the associated camera is set accordingly.

It is believed the operation of the construction will be clear from what has already been said, but it may be recapitulated as follows. When the flash device 1 is attached to the camera, no change takes place in the exposure meter of the camera, and the camera continues to operate with automatic programming, just as though the flash device were not present, so long as the main switch of the flash device remains in the off position. The intermediate lever 9, subject to the bias of the spring 10, is in its normal position, and the two sensing pointers 11 and 12 are deflected in accordance with the light falling on the exposure measuring system of the camera. Just prior to the opening of the shutter, the sensing pointer 11 will be urged by clamping steps 14 against the clamping table 13, and the appropriate value will be transmitted to the shutter or to the stop and interval, with the aid of the transmission lever 15.

Only when the slider switch 6 of the flash unit is actuated to the on position, or to one of its several on positions if there is more than one, will the electronic flash device be switched on by the contacts 3 and 4, and the camera will be switched from automatic programming to flash operation. The switching protuberance 7 now impinges on the intermediate lever 9, and pin 17 of the intermediate lever is moved in the path of the sensing pointer 12. A basic deflection of the sensing pointer for a specific working stop is thereby preset. The basic deflection is of such magnitude that a specific working stop corresponding to the guide number of the electronic flash device is set. Thus, in addition to the switching-on function of the slider switch 6, various working stops corresponding to the guide number are set in the camera, via the various detent positions determined by the detent notches 16.

When the electronic flash device 1 is disconnected, the pin 17 of the intermediate lever 9 is again moved out of the range of the sensing pointer 12 by the return spring 10, so that the camera 2 is automatically converted back to automatic programming. When the flash device 1 is switched off in loaded condition, then the camera again operates automatically and the flash triggered via the electrical connection 19 can be utilized for brightening or fill-in technique.

What is claimed is:

1. The combination of a photographic camera of the type having means for automatically setting a diaphragm aperture, an electronic flash unit detachably mounted on said camera, said unit having an on-off switch movable between an off position and an on position, a switching protuberance in said unit connected to said switch and movable from said unit, means forming an opening in said camera positioned to permit movement of said protuberance into said camera when said flash unit is mounted thereon, means responsive to movement of said switch from off position to on position for moving said protuberance from said unit into said camera, and means within said camera and controlled by said protuberance for setting said diaphragm aperture to a value appropriate to the flash unit, said camera including a photoelectric exposure meter having a movable sensing pointer, means for setting the diaphragm aperture in accordance with the position of the pointer, and means for controlling the position of said pointer in response to the position of said protuberance when said switch is in the on position.

2. The combination as defined in claim 1, wherein said on-off switch is in the form of a slider switch and has a plurality of on positions individually associated with detent means (8, 16).

3. The combination as defined in claim 2, wherein each separate on position of said switch controls a different position of said sensing pointer and thereby determines a different value of the diaphragm aperture.

4. The combination as defined in claim 1, further comprising an intermediate lever (9) in the camera, operatively interposed between said switching protuberance (7) and said sensing pointer (12).

5. The combination as defined in claim 4, further comprising a return spring (10) tending to move said intermediate lever (9) out of the range of said sensing pointer (12).

* * * * *